United States Patent [19]

Sloboda

[11] 4,301,211
[45] Nov. 17, 1981

[54] BRAZING ROD COMPRISING AN ALLOY CORE COATED WITH A LAYER OF ELASTOMER CONTAINING A FLUX

[75] Inventor: Mieczyslaw H. Sloboda, Pinner, England

[73] Assignee: Johnson, Matthey & Co., Limited, London, England

[21] Appl. No.: 62,555

[22] Filed: Jul. 31, 1979

[30] Foreign Application Priority Data

Aug. 1, 1978 [GB] United Kingdom ............... 31791/78

[51] Int. Cl.$^3$ .................... B23K 35/34; B23K 35/365; B32B 15/06
[52] U.S. Cl. ..................................... 428/385; 148/23; 148/25; 156/244.11; 156/244.12; 219/145.23; 219/145.41; 427/59; 427/388.4; 428/390; 428/461; 428/465; 428/469

[58] Field of Search ............... 148/25, 23; 219/145.23, 219/145.41; 427/59, 383 C, 388.4; 428/385, 390, 461, 465, 469; 156/244.11, 244.12

[56] References Cited

U.S. PATENT DOCUMENTS 3,471,310 10/1969 Joseph .................................. 148/23

Primary Examiner—James C. Cannon
Attorney, Agent, or Firm—Cushman, Darby & Cushman

[57] ABSTRACT

This invention relates to brazing materials. In particular it is concerned with a novel combination of brazing alloy and flux. Specifically, a brazing material in accordance with the invention comprises a brazing alloy having a coating comprising a brazing flux and an elastomer.

6 Claims, No Drawings

BRAZING ROD COMPRISING AN ALLOY CORE COATED WITH A LAYER OF ELASTOMER CONTAINING A FLUX

This invention relates to brazing materials. In particular it is concerned with a novel combination of brazing alloy and flux.

Brazing is a commonly used method of joining together metallic parts by means of an alloy of lower melting point than either or any of the parts to be joined. Such an alloy is a so-called "brazing alloy" and, throughout the remainder of this specification, will be referred to as such. In the literature, however, a "brazing alloy" is often also described as "brazing metal" and "filler metal".

In the practice of brazing, the metallic parts are assembled so that there is a small gap, the so-called "joint gap" between their mating surfaces. Next, the parts are heated, at least in the region of the proposed joint, to a temperature above the melting point of the brazing alloy but below their own melting point (or, in the case of two or more parts made of dissimilar metals or alloys, below their lower or lowest melting point) and brazing alloy is applied and melted so as to fill the joint gap by the mechanism of capillary flow. The metallic parts remain unmelted but become firmly united when the brazing alloy solidifies. Typically, brazing alloys melt at temperatures above 425° C.

When metallic parts are joined by brazing, it is essential to ensure that both the molten brazing alloy and the joint area of the parts being joined are free from oxide films at the moment of joint formation. This may be done by carrying out the brazing operation in a reducing atmosphere in a furnace; when, however, brazing is done in air, the required freedom from oxide films of the molten brazing alloy and of the parts being joined is achieved with the aid of a flux. This generally comprises a mixture of borates, fluoborates and, on occasions, chlorides of one or more of the alkali metals.

Although the principal purpose of the flux is to inhibit, during heating, the oxidation of the molten brazing alloy and of at least selected areas of the parts being joined, it also must melt and flow at a temperature below the melting point of the brazing alloy, wet the surfaces of the metallic parts, facilitate the wetting of the metallic parts by molten brazing alloy, and be capable of being displaced by molten brazing alloy.

The normal practice in brazing is to apply brazing flux in the form of a paste to the joint area when the workpieces are cold, to heat the joint area until the brazing temperature is reached, and then to apply the brazing alloy by melting the end portion of a "brazing rod", that is a rod of brazing alloy, at the mouth of the joint gap.

In order to avoid the prior application of flux in this way and thereby to eliminate one stage in the brazing process, flux-coated brazing rods have been developed.

Such flux-coated brazing rods are made by first mixing a brazing flux powder with water or an organic liquid to a dough-like consistency.

The resulting mixture is then placed in the container of an extrusion press and extruded round rods made of brazing alloy whilst these are fed through the centre of the extrusion die. In this way a substantially concentric coating of the flux paste composition of a desired thickness on the brazing rods is produced. Finally, the flux-coated rods are baked to harden the coating.

A disadvantage of currently available flux-coated brazing rods, which are generally made in the above way, is that the coatings are relatively brittle. As a result the flux coatings crack readily in transit and handling so that portions of the coatings may become detached from the rods and their usefulness and effectiveness correspondingly reduced.

An object of the present invention is to provide a flux-coated brazing rod in which the flux coating has a degree of elasticity imparted to it, whereby the disadvantages of known rods, as just described, are eliminated or at least reduced.

According to a first aspect of the invention, therefore, the flux-coating on a flux-coated rod of brazing alloy for carrying out brazing operations comprises an elastomer.

According to a second aspect of the invention, a method of manufacturing flux-coated rods of brazing alloy includes the step of extruding around rods of brazing alloy, a dough-like paste comprising powdered brazing flux and a solution of an elastomer.

Extensive experimental investigation has shown us that an elastomer suitable for the first or second features of the invention should preferably have the following properties:

(i) the elastomer solution when mixed with a flux powder must produce a paste which, upon extrusion on to a brazing rod, is capable of producing a smooth dense continuous coating with sufficient green strength to permit the freshly coated rod to be handled with ease and safety;

(ii) the elastomer must be such that the freshly made mixture of flux powder and elastomer solution will retain its workable consistency for a time sufficiently long for the flux coating operation to be performed;

(iii) the elastomer and any other component of the mixture which remains in the flux coating on the brazing rods when they are ready for use must not interfere with the proper functioning of the brazing flux. Specifically, the elastomer and any other component remaining in the flux coating must have good burn-off characteristics, that is, it or they must not produce excessive quantities of fumes or smoke when a flux-coated rod according to the invention is heated, and it or they must burn off or volatilise completely without leaving behind any solid residues;

(iv) the elastomer must be such that the mixture containing flux powder and elastomer will be capable of producing a coating which, after curing or drying or both, is sufficiently flexible to withstand rough handling;

(v) the elastomer must be such that the mixture containing flux powder and elastomer should have the above desirable features (i) to (iv) in addition to having a sufficiently high flux content to enable brazing operations to be carried out efficiently. Preferably the flux content should be more than 70 wt. %.

According to a third aspect of the invention, therefore, the elastomer of the first and second aspects of the invention must have properties (iv) and (v) specified above and preferably one or more or all of the remaining properties (i) to (iii).

We have now discovered that all the above properties (i) to (v) are possessed by such elastomers as high molecular weight polyisobutylenes and certain synthetic rubbers. Typical of these rubbers are butyl-, polybutadiene-, polyisoprene- and butadienestyrene-rubbers. The polyisobutylene or a synthetic rubber (in a suitable solvent) may be used on their own to make a flux/elastomer mix. Alternatively, mixtures of polyisobutylene and one or more synthetic rubber or mixtures of two or more synthetic rubbers may be used. A suitable solvent is xylene although this is, of course, by no means the only solvent that may be employed.

One composition of the starting mixture that will produce a strong, hard coating with some flexibility is as follows:

1 part by weight butyl rubber,
4 parts by weight xylene, and
10 parts by weight brazing flux powder.

A composition of the starting mixture to produce a somewhat softer and very flexible coating is:

1 part by weight high-molecular weight polyisobutylene,
3 parts by weight xylene, and
11 parts by weight brazing flux powder.

Such mechanical properties of the coating as its strength and flexibility can be varied by suitable choice of the molecular weight of the polyisobutylene when this is used on its own; by using mixtures of polyisobutylene and synthetic rubber in varying proportions; by the choice of the molecular weight of the polyisobutylene in such mixtures and by controlling the proportion of solvent removed by volatilisation during mixing and/or during the drying of the flux coated rods.

For a hard coating polyisobutylene having a molecular weight in the region of 125,000 would be used. For softer coatings such material having a molecular weight of about 90,000 is suitable.

Any of the currently available wide range of brazing alloys and brazing fluxes may be used for the purposes of this invention.

It should be noted here that in conventional brazing operations carried out under a flux cover different fluxes are used depending on the composition and melting point of the brazing alloy and on the composition of the materials to be joined. The same factors govern the composition of the flux used in the production of flux-coated brazing alloy rods.

A typical successful product made in accordance with our invention comprises a silver-copper-zinc-cadmium alloy rod (sold under the Trade Mark EASY-FLO) coated with a mix containing a potassium borate/potassium fluoborate flux (sold under the Registered Trade Mark TENACITY as Tenacity Flux No. 2).

I claim:

1. In a brazing rod comprising a brazing alloy coated with a brazing flux, the improvement which comprises including in said coating polyisobutylene elastomer having a molecular weight of up to 125,000, said elastomer functioning to reduce the tendency of the flux coating to be brittle and consequently crack in transit or handling.

2. A brazing rod according to claim 1 wherein the polyisobutylene has a molecular weight falling within the range 90,000 to 125,000.

3. A brazing rod according to claim 1 wherein the flux is present in an amount of more than 70 weight %.

4. A method of manufacturing a brazing rod according to claim 1 which comprises coating a rod of brazing alloy with a paste comprising the brazing flux in powder form and an organic carrier containing the elastomer and then baking the coated rod.

5. A method according to claim 4 wherein the said carrier is xylene.

6. A method according to claim 5 wherein the coating comprises 1 part by weight polyisobutylene, 3 parts by weight xylene and 11 parts by weight brazing flux powder.

* * * * *